United States Patent [19]

Laskowski

[11] Patent Number: 4,513,507
[45] Date of Patent: Apr. 30, 1985

[54] CONTACT SENSING PROBE FOR A MEASURING APPARATUS

[75] Inventor: Edward L. Laskowski, Seven Hills, Ohio

[73] Assignee: Bendix Automation Company, Cleveland, Ohio

[21] Appl. No.: 528,827

[22] Filed: Sep. 2, 1983

[51] Int. Cl.³ .............................................. G01B 11/24
[52] U.S. Cl. ................................. 33/169 R; 33/172 E; 33/174 L
[58] Field of Search ............ 33/169 R, 172 E, 169 C, 33/172 D, 174 L, 366, 149 J; 250/202

[56] References Cited

U.S. PATENT DOCUMENTS

| | | | |
|---|---|---|---|
| 3,512,852 | 5/1970 | North | 33/366 |
| 3,520,063 | 7/1970 | Rethwishi et al. | 33/169 R |
| 4,078,314 | 3/1978 | McMurtry | 33/172 E |
| 4,158,768 | 6/1979 | Lavelli | 250/202 |
| 4,334,362 | 6/1982 | Germano et al. | 33/169 R |
| 4,338,722 | 7/1982 | Delmas | 33/169 R |

Primary Examiner—Willis Little
Attorney, Agent, or Firm—Kenneth A. Seaman

[57] ABSTRACT

A coordinate measuring machine probe of the type including an arrangement for detecting contact with a surface, in which a light source and a plurality of photocells are arranged to generate an electrical signal upon probe pivoting motion by detection changes in light intensity sensed by the photodetectors. A summing circuit measures the total incident illumination of the photocells and controls the light source to maintain the total illumination of the photocells to be constant.

8 Claims, 6 Drawing Figures

CONTACT SENSING PROBE FOR A MEASURING APPARATUS

BACKGROUND OF THE INVENTION

1. Technical Field

The present invention relates to improvements in contact sensing and measuring probes for measuring apparatus. More particularly, the present invention relates to a probe particularly suited for a coordinate measuring machines in which a portion of the probe deflects (or moves from) its rest position in response to contacting a workpiece surface, then returns to its rest position when contact with the workpiece surface ceases. The present invention is a probe which can be used either as a "digital" probe (providing an on/off signal in response to probe contact) or an "analog" probe (generating a signal the value of which is related to the amount of probe displacement) or as a scanner following the contour of a part, giving dimensional (deviation) information.

2. Background Art

Contact-sensing probes are known in the art in which the probe includes a movable probe stylus mounted in a housing by one or more mechanical springs, and the springs, together with internal structure associated with the stylus and the housing, urge the stylus desired rest position in contact with an electrical circuit. Movement of the stylus away from the rest position breaks the electrical circuit, generating a signal indicative of contact between a part and the stylus. Such probes are shown in U.S. Pat. No. 4,136,458 to Bell et al.; U.S. Pat. Nos. 4,153,998; 4,270,275 and 4,073,314, all to McMurtry, who is also an inventor of probe systems described in UK Patent Specifications No. 1,593,050; 1,573,447 and 1,597,842.

In the probes for coordinate measuring machine applications, it is desirable that the stylus return to its rest position accurately and uniformly so that measurements taken by the measuring machine and probe are uniform.

Probes in which the stylus is spring-biased into its rest position exhibit directional characteristics which have preferred orientations and are not uniform. The spring biased rest positions lead to lobing errors wherein a greater triggering force or displacement is required in one direction than in another direction. Such a preferred direction is especially exhibited in those arrangements where the stylus is suspended within the probe housing by a three-point seat, created by three balls or three rods extending outwardly from the stylus at 120 degrees one from the next and mated within coverging surfaces formed by rods or V-shaped grooves. Such a system is illustrated by various prior art designs including that shown in U.S. Pat. No. 4,270,275.

In such spring-biased probes, the spring provides an initial force to oppose a triggering displacement in response to contact as well as a return force. Ideally, the return force would be high to provide a fast reseating of the probe stylus to insure precise seating, but the use of a strong spring undesirably raises the force necessary to trigger the probe. Thus, the selection of a spring force represents a trade-off between a high recentering force and high triggering force in certain prior art probes when the recentering function and the resistance to triggering is provided by a common element.

DISCLOSURE OF THE INVENTION

The present invention is a contact sensing probe for a measuring apparatus in which an electromagnetic system is coupled to selectively move the stylus within the probe housing. This electromagnetic movement is responsive to a signal (or other sensing means) indicating movement away from the rest position of the stylus, with the stylus carrying an electromagnet adjacent to the permanent magnet and controllably excited to provide force to return the stylus to the rest position.

The present invention has the advantageous effect that the recentering of the probe stylus is not dependent upon either an internal spring element nor the mechanical seating of a plurality of rods or balls. Rather, the "stiffness" of the system can be controlled electrically through adjustment of gain in a recentering circuit.

By the elimination of the springs, rods and balls which establish stylus positioning, the lobing effect has been shown to be reduced in many instances. Reduction of the lobing effect advantageously leads to reduced errors in measurement, or greater accuracy and certainty of measurement. In the present invention, lobing can be reduced through electrical circuitry.

The system of the present invention has circuitry to provide stability in that it resists variations over time by providing lamp intensity regulation based upon closed loop feedback summation of the light received by photocells. Such a system compensates for changes in the components over time and adds to the accuracy and sensivity of the probes.

Other objects and advantages of the present invention will be apparent to those skilled in the art of contact sensing probes in view of the following description of the best mode of carrying out the present invention together with the accompanying drawings.

BEST MODE OF CARRYING OUT THE INVENTION

Figure 1:
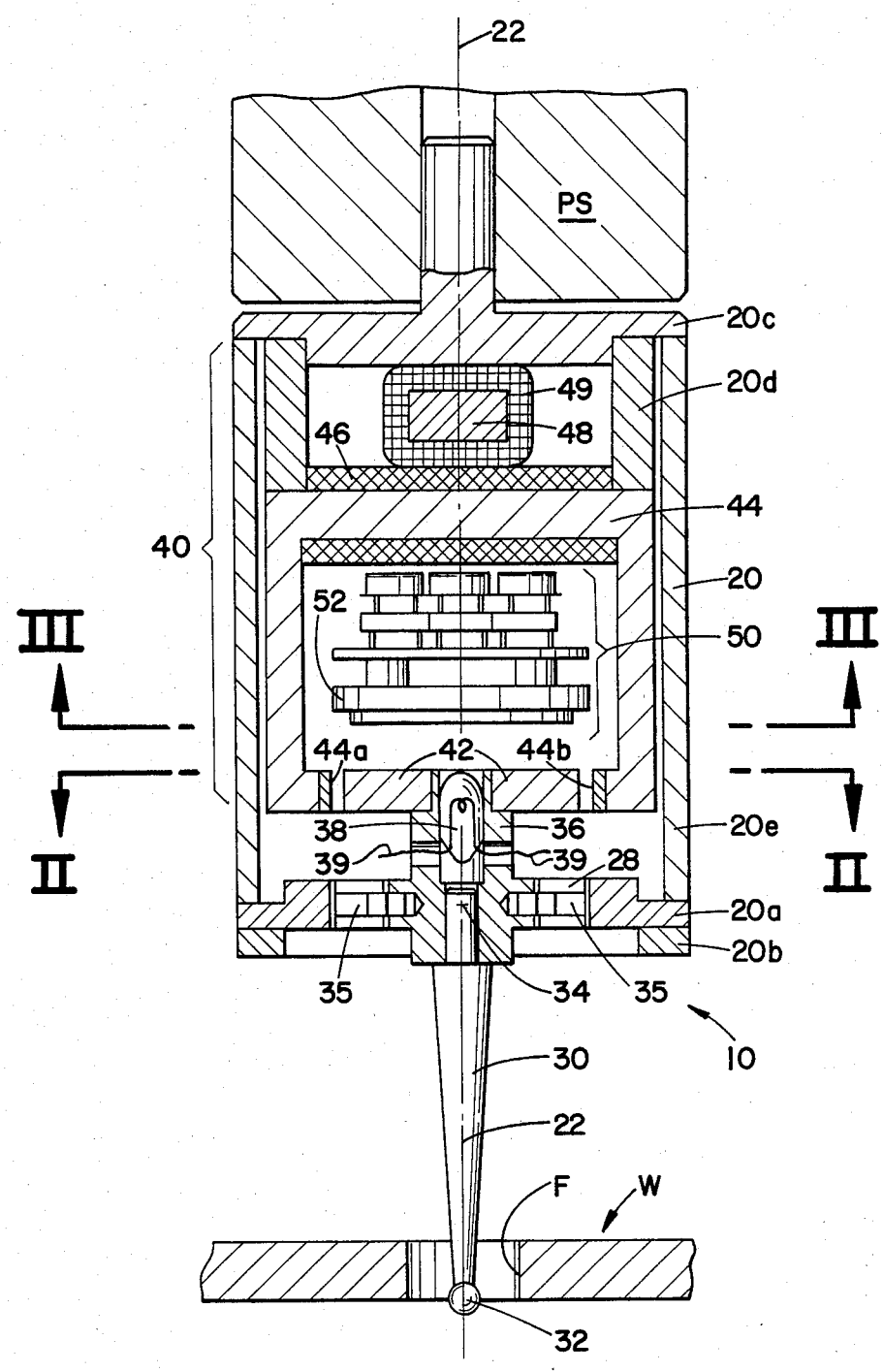
FIG. 1 is a cross sectional view of a contact-sensing probe of the present invention.

FIG. 1 shows a cross-sectional view of a probe 10 constructed generally in accordance with the present invention. The probe 10 is mounted to the end of a probe shaft PS associated with a coordinate measuring machine of the type which is known in the prior art. The probe 10 is shown proximate to a workpiece W having a feature F such a hole therein, the characteristics of which are measured or otherwise inspected by the coordinate measuring machine and associated probe 10. The probe 10 includes a housing 20, a stylus 30, an electromagnetic system 40 and a photodetector system 50. The electromagnetic system 40 serves either for recentering or for "servoing" the stylus 30 as described elsewhere in this patent.

The housing 20 is shown cross-sectioned in FIG. 1 and including housing component pieces 20a, 20b, 20c, 20d, 20e. The housing 20 is generally cylindrical about a central axis 22, with the stylus 30 in one application of the present invention positioned in its rest position to have its length generally along the central axis 22 of the housing 20. Of course, an accurate initial alignment of the stylus 30 along the central axis 22 is not required because the electromagnetic system can be used to bring the stylus into the exact position desired. As will be described later in the connection with alternate embodiments of the present invention, in some instances the probe stylus may be positioned in another known position through the controlled use of the electromagnetic system 50. Advantageously, the housing 20 may include a rear-mounted receptacle (not shown) for electrical circuitry components for the photocell drive and sensing and control of the electromagnet, although the components and connections are not shown in this view.

The stylus 30 of the probe includes a tip 32 of the stylus 30 extending outwardly away from the probe housing 20 and having a surface (such as a hardened sphere) of suitable shape and material for engaging the feature F of the workpiece W to be inspected, which surface and configuration advantageously are chosen based on the type of workpiece and feature to be inspected. The probe stylus 30 includes pivots 35 mounted to a member 28 coupled to the housing 20, although other stylus mounting configurations such as a diaphragm spring or a disc spring are well known and could be used to advantage in the present embodiment. The probe stylus 30 has an internal length or projection 36 which is also advantageously positioned generally along the axis 22 when no force is exerted on the stylus tip 32. At the internal end of the projection 36 is a suitable lamp (photoelectric source of light) 38 with energizing wires 39. This photoelectric source of light 38 could either be a conventional incandescent lamp or an infrared light emitting diode or an exposed end of a fiber optic cable coupled to and transmitting light from an external light source.

A permanent magnet 42 is mounted to the stylus projection 36 to surround the central photoelectric source 38. The magnet 42 is located between two electromagnet poles 44a, 44b which are controllably energized by coil wire 46 carried on a portion of a first electromagnet 44. The electromagnet 44 and its poles 44a, 44b are fixed to the probe housing 20. A portion of a second electromagnet 48 is also shown, with a portion of its coil 49, and the second electromagnet 48 is also mounted to the probe housing 20.

Light from the photoelectric source 38 is directed generally along the axis 22 toward the photodetector system 50 which is fixedly secured to the housing 20 in a conventional manner, not shown in this view. Advantageously, the photoelectric source illuminates a generally circular spot smaller than the photodetector 50 on a plane perpendicular to the axis 22 of the probe.

Figure 2:
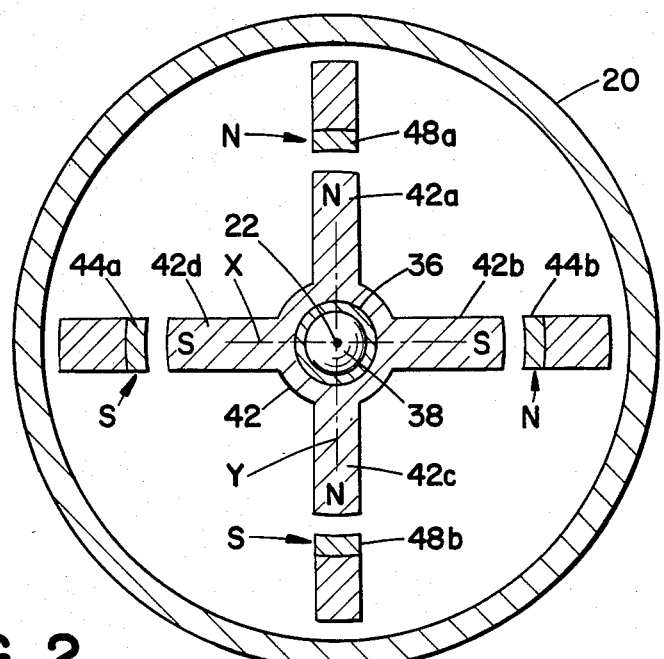
FIG. 2 is a cross sectional view of the probe of FIG. 1, taken along the line 2—2 looking in the direction of the arrows.

FIG. 2 is a cross-section view of the probe 10 of FIG. 1, taken from the line II—II of FIG. 1 looking in the direction of the arrows. As shown in this view, the stylus projection 36 is mounted generally along the axis 22 of the housing 20 and carries the permanent magnet 42 thereon. The permanet magnet 42 includes four segments or poles 42a, 42b, 42c and 42d. The poles of the magnet 42 form generally a cross-shape. The poles 42a, 42c are north poles as indicated by the letter "N" thereon, and the poles 42b, 42d are south poles as indicated with the identifying lable "S".

Shown at a radius from the axis 22 greater than the length of the permanent magnet poles 42a, 42b, 42c, 42d are a pair of electromagnetic poles for each of two electromagnets. The first electromagnet 44, which is also shown in FIG. 1, includes the poles identified as 44a, 44b in this view. Poles 48a, 48b are shown associated with the second electromagnet 48, which extends transverse to the first electromagnet 44.

Figure 3:
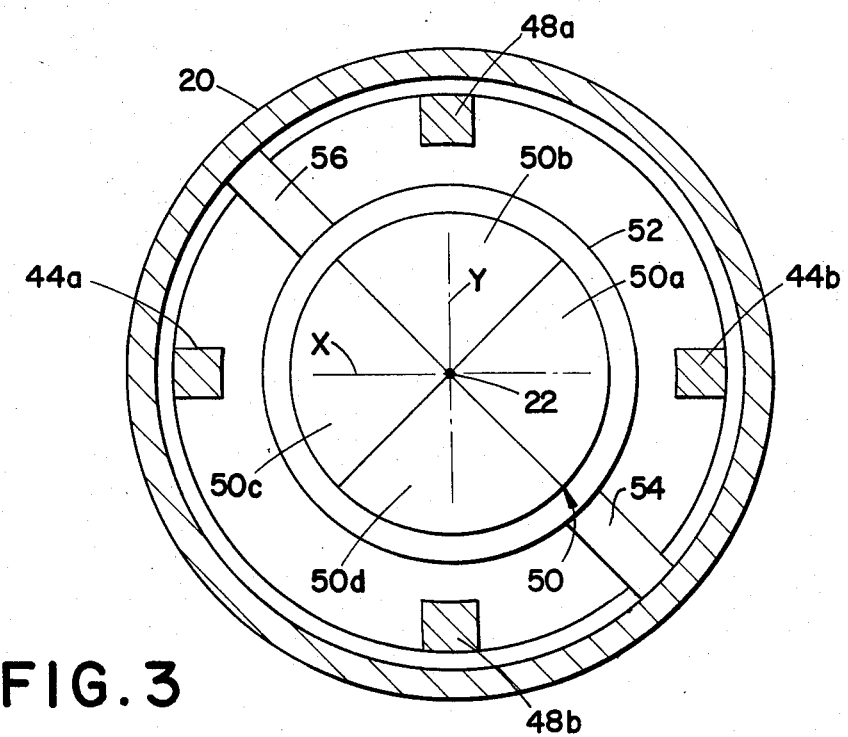
FIG. 3 is another cross-sectional view of the probe of FIG. 1, taken along the line 3—3 looking in the direction of the arrows.

Portions of the photocell assembly 50 are shown in FIG. 3. The photocell assembly 50 is generally circular in this view, and is composed of four pie-shaped quadrants identified as segments 50a, 50b, 50c and 50d. The photocell is centered generally along the axis 22 of the probe housing, with the four quadrants or segments 50a, 50b, 50c, 50d of the photocell 50 intersecting at the probe axis 22. Shown with dotted lines are X and Y axes of the probe housing 20. These axes are chosen so that the stylus displacement in the X direction can be identified by the difference between the intensity from photoelectric segment 50a and the segment 50c and the stylus displacement in the Y direction is related to the photoelectric intensity in photoelectric cell 50b minus the intensity in photoelectric cell 50d.

The photocell assembly 50 is mounted to a plate 52 which is mounted by spokes 54, 56 to the housing 20 above the photocell quadrants.

Figure 4:
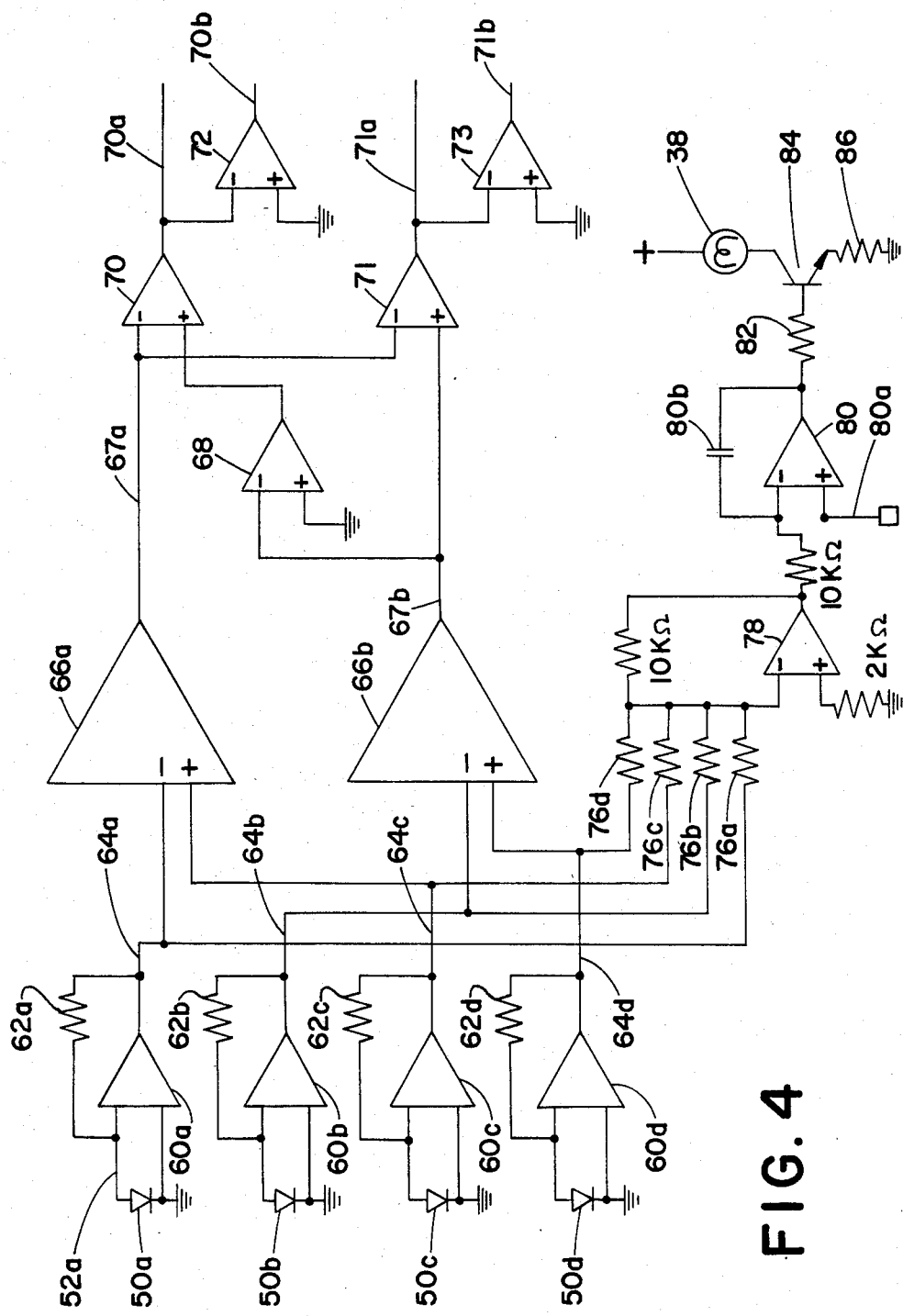
FIG. 4 is an electric circuit diagram for detecting stylus position.

FIG. 4 is an electric circuit diagram for sensing displacement of the stylus tip in an X or Y direction, based upon the change in light intensity at one or more of the photocell segments 50a, 50b, 50c, 50d.

Since the first stage for each segment is identical, only that associated with segment 50a will be described in detail. The segment 50a is a commercially available photo silicon solar cell having a grounded cathode which generates an output current on an output line 52a coupled to its mode proportional to the intensity of light incident on it. The output line 52a is an input to an operational amplifier 60a which has a feedback resistor 62a and whose function is to generate an output voltage on line 64a proportional to the input current on the line 52a.

Differential amplifiers 66a, 66b generate outputs 67a, 67b which quantify photoelectric imbalance between opposing segments 50a, 50c and 50b, 50d, respectively, indicating displacement of the stylus in X and Y directions, respectively.

Voltage inverter 68 allows the differential amplifiers 70, 71 to generate differential voltages 70a, 71a representative of the difference and sum, respectively, of the X and Y imbalance. Inverters 72, 73 create inverted values of the voltages 70a, 71a on line 70b, 71b. The output line 70a, 70b, 71a and 71b represent the various values needed for threshold detection circuitry. These values are, on line 70a ($-X-Y$), on line 70b ($X+Y$), on line 71a ($-X+Y$) and on line 71b ($X-Y$) to be used in the circuits of FIGS. 5A and 5B as described later herein.

It will be understood that various algorithms could be used to determine that the stylus had been displaced by at least a predetermined amount, and these algorithms could be approximated in various ways also. In the ideal situation if the stylus 30 is displaced in any direction by more than 2, then a triggering signal and/or recentering should take place. In that situation, when the square of the X displacement plus the square of the Y displacement exceeds the square of 2, the stylus has been displaced.

In the present environment, it has been determined that a sensing scheme using summation of the absolute value of displacements in X and Y as exceeding 2 (a preset limit) is a close enough approximation.

In addition to the comparison of light intensities provided by amplifiers 66a, 66b and subsequent circuitry, the voltages on lines 64a, 64b, 64c, 64d (from the four segments 50a, 50b, 50c, 50d, respectively) are summed through resistors 76a, 76b, 76c, 76d, respectively, and an amplifier 78. The output of the amplifier 78 is compared with a reference value on a line 80A by an operational amplifier 80 used as an integrator the function of which is to reference compare the sum of the light intensities with the reference value on line 80A. Any deviation is coupled to the transistor 84 to cause an opposite effect on the lamp 38. In this manner, the lamp 38 has an intensity which is varied so that the sum of the photoelectric intensities sensed remains effectively constant. In this manner, any variation of stylus position (by displacement of its tip) is amplified, because any increase in the light incident of one photocell also causes a resultant decrease in at least one other cell.

Figure 5A:
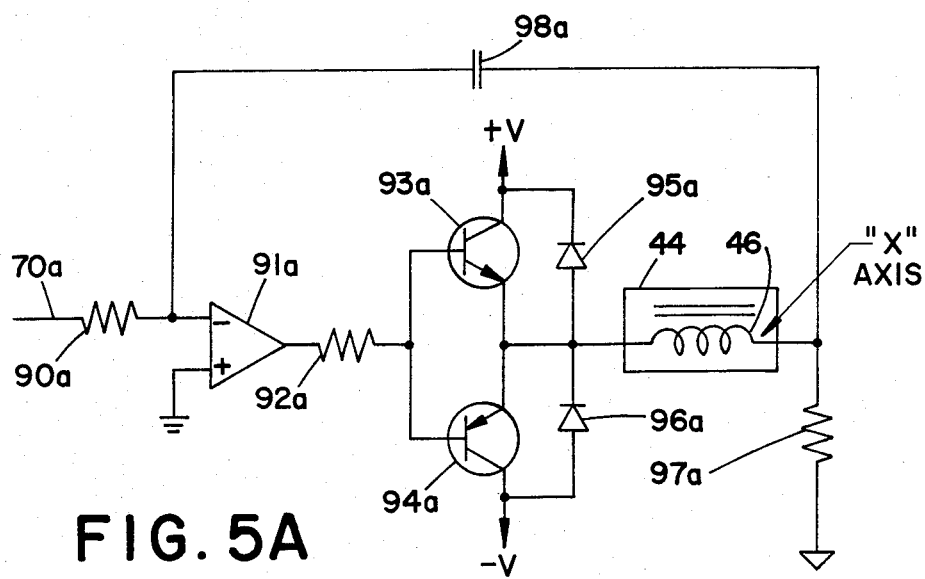
FIGS. 5A and 5B are electric circuit diagrams for controlling the recentering of the probe stylus.
Figure 5B:
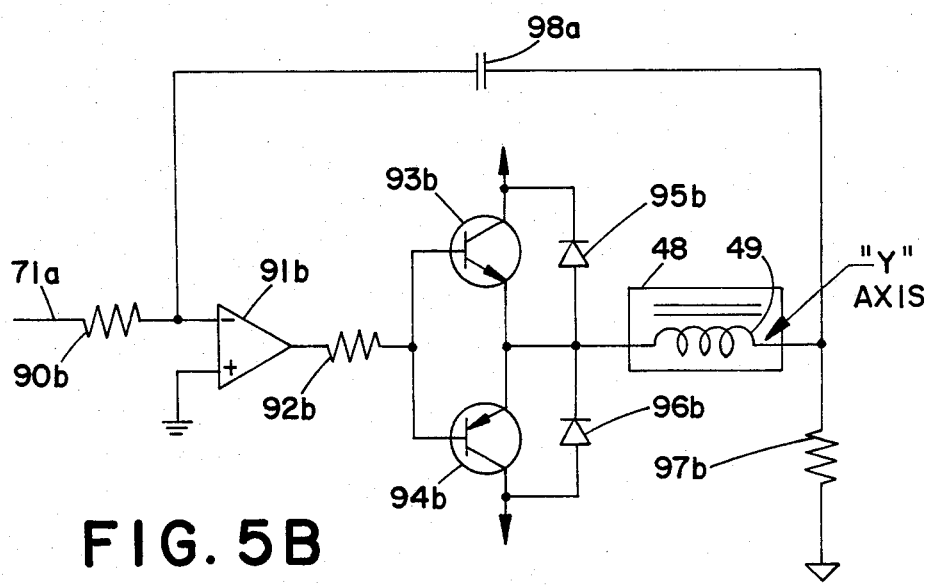

FIGS. 5a, 5b are the control circuits for recentering in the X and Y directions, respectively, with FIG. 5a being discussed as representative. A positive signal on the line 70a (from FIG. 4) indicates displacement of the stylus generally to the right in FIG. 1, causing segment 50c to receive greater light than segment 50a.

This signal on line 70a, representation of X imbalance from line 71b in FIG. 4, is coupled through a resistor 90a to the inverting input of an operational amplifier 91a, whose output is coupled through a resistor 92a to steering transistors 93a, 94a and diodes 95a, 96a, then to the coil 46 of the electromagnet 44. A resistor 97a and an integrating capacitor 98a are shown to complete the circuit. The polarity of the electromagnet drive is connected so that it operates to move the stylus to reduce the imbalance (and eventually eliminate it).

The foregoing description illustrates the use of the electromagnetic system to recenter the probe in response to contact which displaces the probe. By appropriate changes to the circuitry associated with the recentering drive circuit, the stylus could be initially positioned at any given inclination in either or both of the X and Y directions, for example, to inspect a bore which is inclined with respect to the axes.

Also, the structure of an electromagnetically driven probe as previously described could be used as an inspection system in which the probe was positioned nearby an object whose contour was to be inspected, with the probe stylus then driven to oscillate at an amplitude greater than the distance to the object, whereby the stylus could travel no further when it contacted the object. The maximum travel of the stylus (as measured by the photoelectric system) would be indicative of the location of the surface. By moving the probe shaft along the contour, the locations of the various surface portions along that contour could be established.

REPRESENTATIVE VALUES AND COMPONENTS

| Reference No. | Type | Value/Part No. |
| --- | --- | --- |
| 60a, 60b, 60c, 60d, 78 | Operational Amp | Burr Brown OPA 103 |
| 66a, 66b | Differential Amp | Burr Brown 3629 |
| 68, 70, 71, 72, 73 | Differential Amp | Burr Brown 3627 |
| 76 | Resistor | 100 ohms |
| 76a, 76b, 76c, 76d | Resistor | 10k ohms |
| 80 | Differential Amp | 741 |
| 80b | Capacitor | .01 microfarad |
| 82 | Resistor | 5k |
| 84 | Transistor (NPN) | RCA 40348 |
| 86 | Resistor | 100 ohms |
| 90a, 90b | Resistor | 100k ohms |
| 91a, 91b | Differential Amp | Burr Brown 35016 |
| 92a, 92b | Resistor | 2870 ohms |
| 93a, 93b | Transistor (NPN) | MJE 1100 |
| 94a, 94b | Transistor (PNP) | MJE 1090 |
| 95a, 95b, 96a, 96b | Diode | 1N 4005 |
| 97a, 97b | Resistor | 0.5 ohm, 10 watt |
| 98a, 98b | Capacitor | 3 microfarad |

The foregoing description of the preferred embodiment of the present invention should be understood to be merely illustrative of the best mode of carrying out the present invention and not in limitation thereof. Many modifications and substitutions for the particular configuration and structure described in the proceeding paragraphs will be apparent to one skilled in the art. For example, there are many suitable arrangements and structures for movably mounting and suspending a probe stylus within a housing, and the present invention is not particularly limited to any specific arrangement. Additionally, while the present invention has been described in connection with photoelectric detection of contact sensing, other methods of sensing can be used also. Further, some features of the present invention can be used to advantage without the corresponding use of other features. The recentering feature provided by the particular geometry of electromagnets and permanent magnet arrangement disclosed in the present application is desirable, but not crucial, to the present invention. Accordingly, the structure, function and operation disclosed should be considered as merely illustrative of one method of and apparatus for carrying out the present invention.

Having thus described the invention, what is claimed is:

1. A probe for contacting a workpiece for inspection and measuring comprising:
   a body;
   a stylus mounted with said body for pivoting movement and including a stylus tip for engaging a workpiece, a medial mounting of said stylus to said body allowing movement therebetween;
   a source of light mounted within said body;
   means for detecting the light from the light source;
   said light source and detecting means mounted to cause a variation in light incident on said detector means with pivoting movement of said stylus and for thereby indicating the position of the stylus tip, said detecting means including:
   a plurality of photoelectric sensors mounted to the body;
   detecting circuit disposed within said body and coupled to said photoelectric detectors and detecting changes in the amount of light from the individual photodetector sensors as an indication of stylus tip displacement;
   summing means operatively connected to said plurality of sensors and summing the total intensity of light incident on said plurality of photoelectric sensors and producing a corresponding signal;

a constant value reference signal source;

comparison means comparing said signal of said summing means and said reference signal source and generating a feedback signal corresponding to any differences therebetween; and means mounted within said body and operatively connected to said light source and responsive to said comparison means to vary the output of said light source so as to control the total intensity of light incident on the sensors to be effectively constant.

2. A probe of the type described in claim 1 wherein said probe additionally includes an electrically energizable electromagnetic means mounted to said body and said stylus includes a magnetic member associated therewith and responsive to the electromagnetic means for centering said stylus within said housing in response to energization of said electromagnetic means, whereby energization of the electromagnetic means causes magnetic forces on the magnetic member.

3. A probe for engaging a feature on a part comprising:

a housing having a cavity with an internally mounted photoelectric detector;

an elongated stylus pivotally mounted to said housing medially along the length of said stylus, with the outwardly projecting portion of said stylus including the tip for engaging the feature of the part and with the inwardly extending portion of said stylus carrying a light source projecting illumination toward the photoelectric detector;

means coupled to the photoelectric detector for determining displacement of the probe tip by change in the position of the light source and therefore the amount and the location of illumination detected by the photoelectric detector; and means for positioning said stylus in predetermined location, said means including:

a magnet carried on the stylus;

an electromagnet carried by the housing and positioned adjacent to the magnet; and means for controlling the energization of the electromagnet in response to the means determining the displacement of the probe tip to move the stylus to a predetermined position when the stylus tip has been moved.

4. A probe of the type described in claim 3 wherein said stylus includes a plurality of magnets and the housing includes a plurality of spaced electromagnets each of which electromagnets is positioned in proximity to one of the magnets to control the movement of the stylus in a plurality of directions.

5. A probe of the type described in claim 4 wherein said stylus carries four separate magnet portions located in a common plane and spaced approximately 90 degrees away from another magnet and said electromagnet includes four pole portions each positioned in the plan generally of the magnet portions and located at 90 degrees away from the adjacent electromagnet poles and opposite the magnet portions, so that each electromagnetic poles operate primarily on one magnet portion.

6. A probe of the type described in claim 5 wherein said housing is generally cylindrical about an axis and said stylus is located and mounted within said housing to be generally positioned along said axis when the probe tip is not engaging a feature on a part and said magnet and said electromagnets are positioned symmetrical about said axis, with the engagement of the probe tip pivoting said magnet and said light carried by said stylus away from said axis and said electromagnet and said magnet being operative to return the stylus to a position along said axis after the probe ceases to engage the feature on the workpiece.

7. A probe of the type described in claim 6 wherein said electromagnets are controlled by a closed loop feedback system to position the stylus along the axis of the housing when the electromagnets are energized.

8. A probe of the type described in claim 2 wherein the energization of the electromagnets is responsive to detection of a force on the stylus and is of a direction and magnitude to recenter the stylus along a central axis extending from the probe housing.

* * * * *